INVENTORS
WILLIAM D. GUNTER, Jr.
RICHARD M. BROWN

ATTORNEY

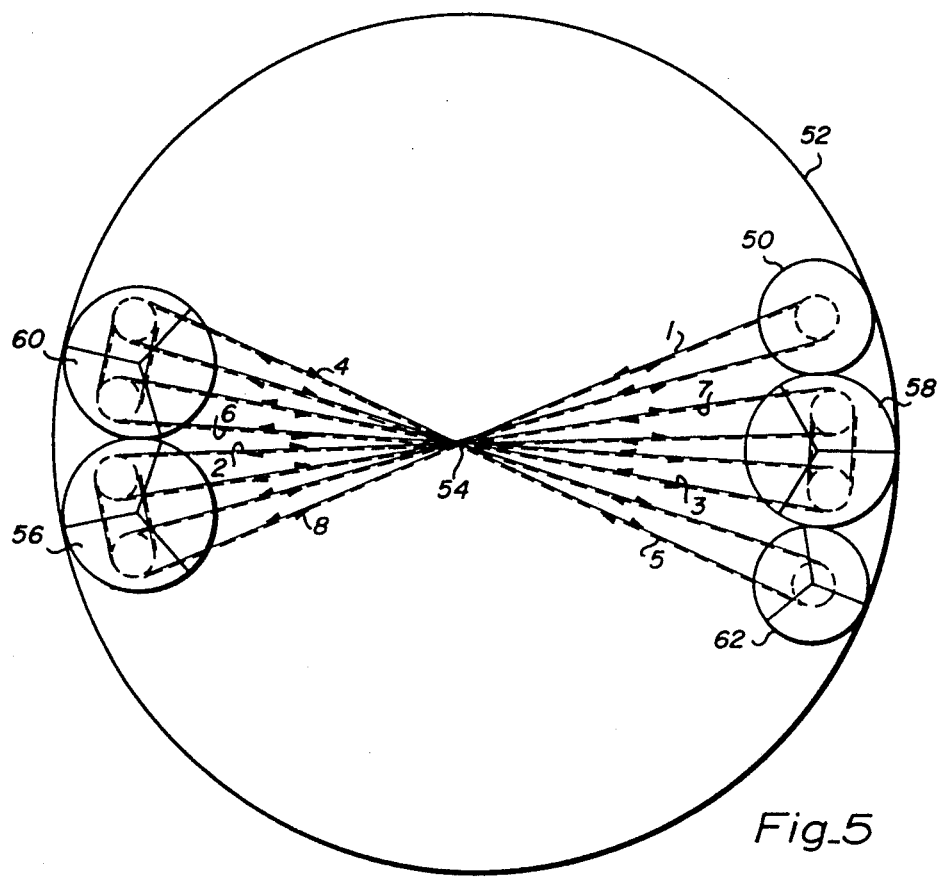
Fig_5
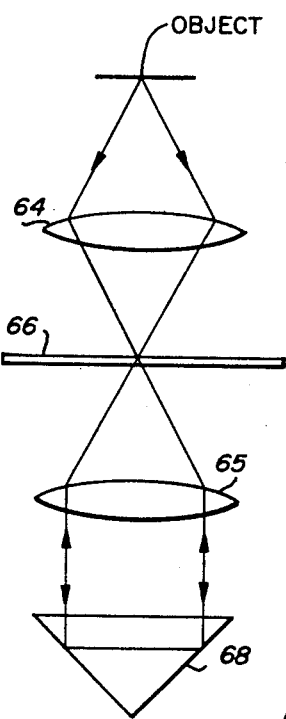
Fig_6
INVENTORS
WILLIAM D. GUNTER, Jr.
RICHARD M. BROWN

United States Patent Office 3,715,152
Patented Feb. 6, 1973

3,715,152
MULTIPLE-PASS REIMAGING OPTICAL SYSTEM
William D. Gunter, Jr., 5290 Dellwood Way, San Jose, Calif. 95118, and Richard M. Brown, 280 Easy St., Apt. 6E, Mountain View, Calif. 94040
Filed Jan. 19, 1971, Ser. No. 107,659
Int. Cl. G02b 17/08
U.S. Cl. 350—202        14 Claims

ABSTRACT OF THE DISCLOSURE

An optical imaging system for enabling nonabsorbed light imaged onto a photodetective surface to be collected and reimaged one or more times onto that surface in register with the original image. The system includes an objective lens, one or more imaging lenses, one or more retroreflectors and perhaps a prism for providing optical matching of the imaging lens focal planes to the photodetective surface.

---

Figures 1, 2:
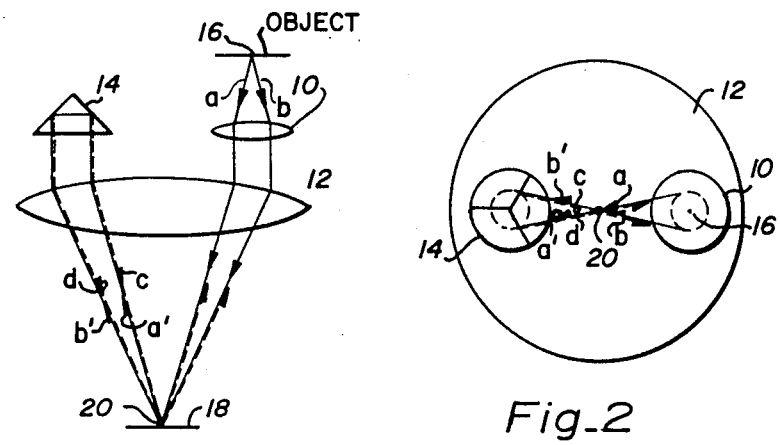

The invention described herein was made by employees of the United States Government and may be manufactured and used by or for the Government for governmental purposes without the payment of any royalties thereon or therefor.

BACKGROUND OF THE INVENTION

Field of the invention

The present invention relates generally to optical imaging systems and more particularly to an optical imaging system for increasing the efficiency of absorption of light or other radiant energy at the light sensitive surface of an imaging detector.

DESCRIPTION OF THE PRIOR ART

Imaging detectors, such as photoelectric image tubes and photographic emulsions, are typically inefficient in their use of light because they do not absorb all of the light energy which they receive; much of the incident light is lost by reflection and transmission. The efficiency of systems employing such detectors can be substantially improved if means are provided which enable the amount of incident light absorbed by the system to be increased. Prior art in this field includes devices for increasing the sensitivity of photocathodes in nonimaging systems by the use of total reflection. One such device is disclosed by Gunter et al. in Applied Optics, vol. 4, April 1965, page 512.

However, with the exception of one special case disclosed by W. C. Livingston (Applied Optics, vol. 5, No. 8, August 1966, page 1355) wherein optical gains in sensitivity are obtained in the case of an image that carries information in only one spatial direction, i.e., such as at the image plane of a non-stigmatic spectrograph, no techniques have heretofore been known which allow the application of optical enhancement to two-dimensional images.

SUMMARY OF THE PRESENT INVENTION

In accordance with the present invention, an optical imaging system is provided wherein parallel light rays from a distant object are focused upon a detecting surface and reflected; nonabsorbed light striking the detector is recollimated by a lens, reversed in direction by a retroreflector, and then passed back through the lens to again be focused at the point at which it initially struck the face of the detector. Where more than one reflective pass is desired, a retroreflector such as a corner cube is utilized to cause the rays of light to be shifted laterally as well as to be reversed in direction. As long as the light again enters the aperture of the focusing system, the reimaging will take place in register with the initial imaging.

Multiple-pass variations of a simple two-pass system are disclosed which use larger optics to allow light which has been reflected from the image plane to strike it many times. Basically, the multiple-pass system is similar to the two-pass system; except that more retroreflectors are required. The present invention has particular application for use with image intensifiers, image orthicons, or other photoemissive imaging detectors and returns light reflected from the light-sensitive face of such devices back to the face one or more times in focus and in register with the original image.

The general concept of the present invention for increasing the absorption of light in optical imaging devices has application (1) where the reflection is dielectric reflection pass the critical angle (total reflection, ATR), (2) where it is ordinary dielectric reflection, (3) where it is metallic or similar reflection, and (4) where the loss mechanism is the transmission of light through a photosensitive surface.

Other advantages of the present invention will become apparent to those skilled in the art after having read the following detailed disclosure of the preferred embodiments which are illustrated in the several figures of the drawings.

Figures 3, 4:
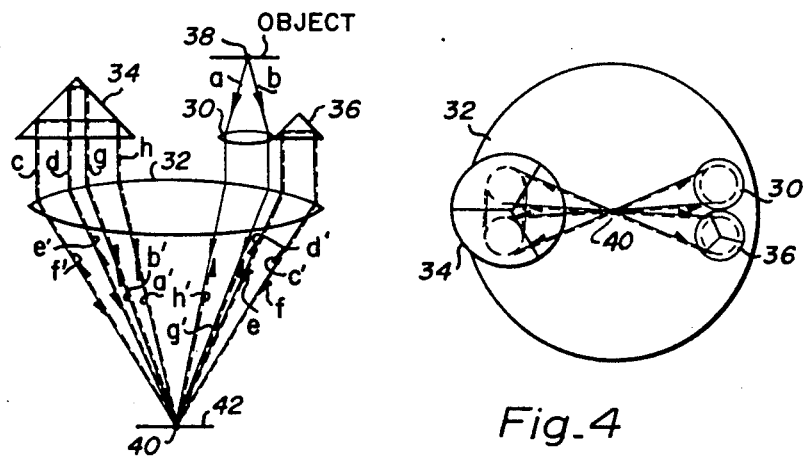
Figure 7:
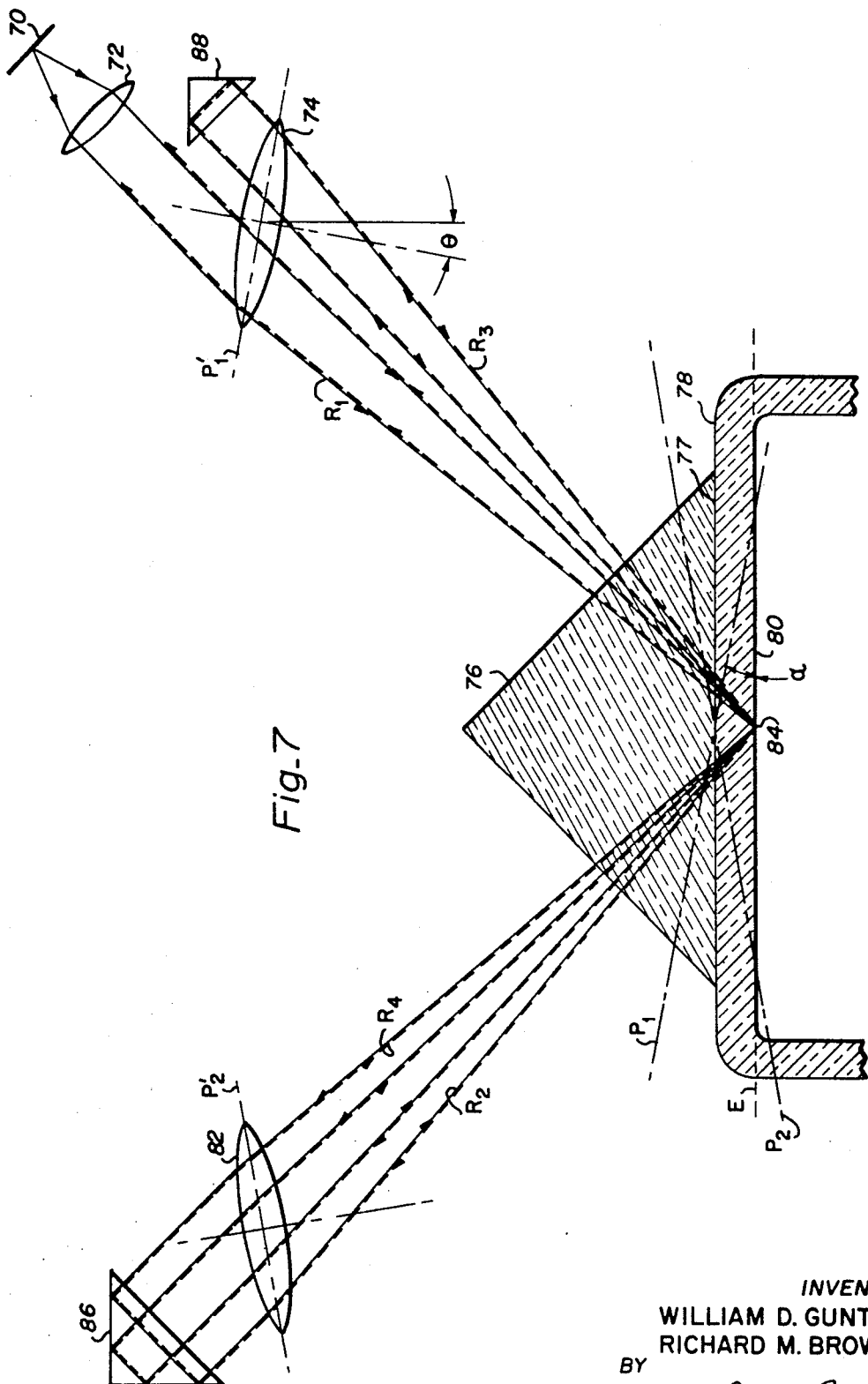

In the drawings
FIGS. 1 and 2 are profile and plan views, respectively, of a simplified double-pass embodiment of a reimaging optical system in accordance with the present invention.
FIGS. 3 and 4 are profile and plan views, respectively, of a simplified multiple-pass embodiment of a reimaging optical system in accordance with the present invention.
FIG. 5 is a plan view of an alternative embodiment of a multiple-pass reimaging optical system in accordance with the present invention.
FIG. 6 illustrates an alternate embodiment in accordance with the present invention.
FIG. 7 illustrates an alternate embodiment of an optical intensifying system in accordance with the present invention.

DETAILED DESCRIPTION OF THE PREFERRED EMBODIMENTS

Imaging detectors such as image dissector tubes or photographic emulsions and the like, are inefficient in their use of light because they do not absorb all of the light incident upon them. A class of optical systems has thus been devised which makes more efficient use of this light. By reimaging the light reflected from or transmitted through the detector, an increase in efficiency is made possible while maintaining a two-dimensional image.

In a simple optical system which images parallel light, there is a one-to-one correspondence between points in the image plane and the direction in which the light enters the system. That is, a parallel beam of light entering the system at any point in the entrance aperture will be focused to a point which is dependent only upon the direction from which the light originates. Similarly, light leaving a point on the focal plane and traveling through the aperture will, no matter where it strikes the aperture, leave the system in a direction that depends only upon its point of origin. In accordance with this principle, an optical system is provided by the present invention wherein light, which has been reflected from or transmitted through the focal plane of the system, is collected and redirected so that it again impinges on the detector focal plane in register with the original image. By causing the initially unabsorbed light to be reimaged upon the detector, the amount of light absorbed and used by the detector is increased.

A simplified embodiment of the invention is illustrated in FIGS. 1 and 2 of the drawings and includes a collimating lens 10, an imaging lens 12, and a retroreflector 14. Collimating lens 10 renders parallel light rays $a$ and $b$ emanating from a point on the object 16, and these parallel light rays are projected through imaging lens 12 which focuses them to an image at point 20 upon the light-sensitive face of a detector 18. Retroreflector 14, which may take the form of a corner reflector, a cat's eye reflector, or other suitable device which reverses the direction of a light beam, is positioned to receive the reflected light rays $a$ and $b$ after they are recollimated by lens 12, reverse their direction and send them back through lens 12, as indicated by dashed lines $c$ and $d$ to be reimaged back upon the face of detector 18 at point 20.

FIG. 2 is a top view which further illustrates the embodiment shown in FIG. 1. Note that in this embodiment light from point 16 of the object is caused to impact twice at point 20 on detector face 18 before it leaves the system.

Turning now to FIGS. 3 and 4 of the drawings, a multiple-pass embodiment of the invention is shown which is an extension of the two-pass device and includes a collimating lens 30, an imaging lens 32, a large corner reflector 34, and a small corner reflector 36. In this embodiment, light rays $a$ and $b$ emanating from a point 38 on the object are rendered parallel by collimating lens 30 and are focused at point 40 on the face of detector 42 by imaging lens 32. The light rays $a$ and $b$ which are reflected from detector 42 are collected by imaging lens 32, recollimated, and passed into retroreflector 34 which reverses their direction, as well as displacing them, as indicated by rays $c$ and $d$, to the side of the reflected rays $a$ and $b$. Rays $c$ and $d$ are then again refocused by lens 32 upon point 40. Light reflected from these beams, as represented by the rays $c'$ and $d'$, is passed through imaging lens 32 where it is recollimated, passed into the small retroreflector 36, which reverses the direction of the light rays, as indicated by rays $e$ and $f$, and sends them back through lens 32 in a direction antiparallel to the incoming rays $c'$ and $d'$, to be focused again at point 40. Light reflected from this pass across detector 42, as indicated by the rays $e'$ and $f'$, is again passed through lens 32, recollimated and passed into retroreflector 34 where it is displaced laterally and again returned (rays $g$ and $h$) through lens 32 and refocused upon point 40. Light reflected during this pass, as indicated by rays $g'$ and $h'$, is finally lost in passing back through lens 30 antiparallel to the rays $a$ and $b$.

For reasons of clarity, collimating lens 30 and corner reflector 36 have been shown in a single plane in FIG. 3. In practice, however, they are located as shown in FIG. 4 to make the system more adaptable to larger numbers of passes.

In FIG. 5 of the drawings, a more complex eight-pass embodiment of the invention is illustrated (in plan view only since a section passing through lens 50, point 54, and retroreflector 56 would be similar to that illustrated in FIG. 3). In this embodiment light rays from an object passing through the collimating lens 50 will be rendered parallel and upon passing through the imaging lens 52 will be focused (rays 1) upon a point 54 on a detecting surface positioned beneath lens 52. Nonabsorbed light from these rays, which is reflected from the detecting surface, passes up through imaging lens 52 where it is rendered parallel and directed into a suitable retroreflector 56 and displaced laterally in the clockwise direction (about lens 52). The returning rays are then directed back through imaging lens 52 to make a second pass (rays 2) across point 54. Nonabsorbed light from rays 2 is again reflected up through imaging lens 52 where the rays are again rendered parallel and cast into retroreflector 58 where they are again displaced laterally in the clockwise direction, passed back through imaging lens 52 and again focused (rays 3) on point 54.

Nonabsorbed light from this third pass is once again passed through imaging lens 52 where it is rendered parallel and directed into retroreflector 60 which again displaces the light rays laterally in the clockwise direction and directs them antiparallel to the incoming rays and back through imaging lens 52 where they (rays 4) are again focused upon point 54 in making a fourth pass across the detecting surface. Nonabsorbed light from this pass is subsequently directed back through imaging lens 52, rendered parallel and into a nontranslating retroreflector 62 where the light is reflected back upon itself and redirected through imaging lens 52 to make a fifth pass (rays 5) across the point 54. Similarly, nonabsorbed light resulting from each subsequent pass is directed back through each of the retroreflectors (as indicated by the rays 6, 7, and 8) in the reverse directions to those taken in making passes 1–4. Following the eighth pass, any nonabsorbed light is sent back through collimating lens 50 and out of the system. Although this embodiment illustrates that at least eight passes can be made in accordance with the present invention, it will be appreciated that a substantially larger number of passes can be accommodated by merely providing additional retroreflectors around the periphery of imaging lens 52.

Another embodiment of the invention which is related to those previously shown is useful for cases where reimaging of light transmitted through the detector is desired. This embodiment, as shown in FIG. 6, is somewhat simpler to construct than the previous embodiments as all elements are axially aligned. It includes two lenses 64 and 65 positioned on each side of a detector plane 66. A retroreflector 68 (shown here as a corner reflector) is positioned beneath lens 65 to return the light rays which were transmitted on the first pass through the detector. These rays are reimaged on the detector by lens 65 so that further absorption might occur. In this embodiment, it is not necessary that the light first incident on lens 64 be collimated since proper choice of lens position will allow this device to focus an image on the detector plane 66.

In some detectors (typical photocathodes, for example) light is lost by both reflection and transmission. One way to solve this problem would be for lens 32 of FIGS. 3 and 4 to be an immersion lens, with the space between the lens and the detector plane 42 filled completely by glass, immersion oil, or other high index material. Then if the light rays strike the detector plane 42 at a sufficiently oblique angle, they will be totally reflected and no light will pass beyond the detector plane 42. Any light which is not absorbed will be reflected as described earlier for FIGS. 3 and 4 and returned several times for further absorption at the detector plane.

An alternate embodiment, which is shown in FIG. 7, also uses total internal reflection to capture light that would otherwise have been lost to both reflection and transmission. Although the inventive concept has numerous other applications, this particular embodiment is designed for use with image intensifiers, image orthicons, or other photoemissive imaging detectors and operates to return light to the photocathode one or more times in focus and in register with the original image.

In FIG. 7, the example is a photoelectric image tube where 80 is the photocathode and 78 is the plane parallel entrance window. Without the use of some auxiliary optics such as the prism 76 (or the use of an immersion lens as in the last example) it is not possible to introduce light into the window 78 at angles large enough for total reflection to occur at the plane E (coincident with the photocathode 80). The prism 76 is therefore necessary to the device and must be coupled to the window 78 by a coupling fluid at 77.

As illustrated in FIG. 7, light from each point on a two-dimensional object 70 is rendered parallel by a collimating lens 72 and then passed through an imaging lens 74 which is oriented so that if the prism 76 and image tube window 78 were removed the light rays would come to a focus at the plane $P_1$ which is parallel to the plane $P'_1$ of lens 74.

In practice, except for a slight spherical abberation, the combined effect of prism 76 and the image tube window 78, which is optically coupled to it, is to expand the focal plane of lens 74 from $P_1$ to the plane E. The precise angle $\alpha$ between the planes E and $P_1$ (identical to the angle $\theta$ by which lens 74 is tilted with respect to a normal to plane E) can be determined, by experiment or calculation, to render the actual image plane coincident with the photocathode. If the prism is a 45°–90°–45° prism and both it and window 78 are glass of index $n$, then the angle $\theta$ is that angle having a tangent equal to $(n-1)/(n+1)$. If $n=1.5$, this corresponds to $\theta = 11.3°$.

The imaging lens 82 is similarly inclined with its plane $P'_2$ aligned parallel to plane $P_2$. Because of the presence of prism 76 and the image tube window 78, lens 82 also focuses parallel light at the plane E of photocathode 80 rather than at the plane $P_2$. The light rays $R_1$ from object 70 which are focused upon point 84 and not absorbed by photocathode 80, are reflected up into imaging lens 82 where they are rendered parallel and directed into corner cube 86. Corner cube 86 then returns each ray in a direction antiparallel to that from which it came, thereby assuring that rays $R_2$ will focus at point 84 where they make a second pass across the photocathode 80. As in the previous embodiments, a second action of corner cube 86 is to displace the beam of light laterally so that its point of exit from the cube is not the same as its point of entry.

Since the rays $R_2$ are neither parallel nor antiparallel to the reflected rays $R_1$, light from rays $R_2$ which is not absorbed at photocathode 80 will be reflected in a direction so that it passes through lens 74 and into the small corner cube 88 rather than back into collimating lens 72. Corner cube 88 can be centered on the bundle of incident rays so that taken as a whole, the bundle reverses itself without lateral deflection, and light rays $R_3$ return through the system as they entered thereby being directed so as to strike photocathode 80 a third time. Light not absorbed by photocathode 80 during this third pass is again reflected back up through imaging lens 82 where it is again rendered parallel, and it is reversed and displaced laterally by corner cube 86. Rays $R_4$ are then directed back through imaging lens 82 where they are focused upon point 84 making a fourth pass across photocathode 80. However, light reflected from photocathode 80 during this fourth pass is reflected back up into imaging lens 74, through collimating lens 72 and then out of the system. Of course, more than four passes can be obtained in systems modified in accordance with the embodiment shown in FIG. 5.

For reasons of clarity, collimating lens 72 and corner cube 88 have been shown in the plane of the drawing displaced above and below the center of lens 74. In practice, however, they would be displaced into and out of the plane of the drawing to secure slightly better results and to make the system more easily adaptable to more than four passes of the light across photocathode 80.

Although the above description has been illustrated in terms of simplified schematic embodiments, it is to be understood that in reducing the invention to practice certain modifications and extensions of the invention may become apparent to those skilled in the art. For example, it is intended that the use of the term "light" shall include both visible and nonvisible electromagnetic radiation. It is also contemplated that the principles of the invention can be extended to apply to nonelectromagnetic energy applications wherein such energy can be focused in a similar manner, sound and pressure waves, for example. Moreover, the use of the term "lens" is intended to include other focusing or collimating devices, such as reflective or catadioptic devices, and the terms "corner cube" and "corner reflector" are intended to include other devices which emit energy in a direction antiparallel to the direction of the incident energy. Similarly, the term "transmitted" as used in the claims is deemed to be synonymous with reflected and scattered and to include any other method in which nonabsorbed light energy is removed. Accordingly, this disclosure is not to be considered limiting and the appended claims are to be interpreted as covering all modifications which fall within the true spirit and scope of the invention.

What is claimed is:

1. An optical imaging system comprising:
   optical means for focusing light from an object onto a light absorbing means to define thereon a first image of said object, said optical means including a collimating lens for collimating light from said object, and a first imaging lens for focusing the collimating light onto the light absorbing means and means for collecting non-absorbed light reflected, transmitted and/or scattered from the light absorbing means and refocusing it back onto said light absorbing means to define a second image of said object in focus and in registry with said first image.

2. An optical imaging system as recited in claim 1 wherein said means for collecting non-absorbed light includes said imaging lens which is operative to recollimate said light, a retroreflector being operative to return said collimated light to said imaging lens, said imaging lens being additionally operative to refocus the collimated light onto the light absorbing means to provide said second image.

3. An optical imaging system as recited in claim 2 wherein said means for collecting non-absorbed light further includes a second imaging lens serving to recollimate non-absorbed light which is transmitted through said light-absorbing means, and a second retroreflector serving to redirect the recollimated light to said second imaging lens, said lens also serving to refocus the collimated light upon the light absorbing means in focus and in register with the first image.

4. An optical imaging system as recited in claim 1 wherein said means for collecting non-absorbed light includes a retroreflector and a second imaging lens for collimating said non-absorbed light and directing it into said retroreflector, said second imaging lens also serving to refocus the collimated light upon the light absorbing means after it is returned from said retroreflector to provide said second image.

5. An optical imaging system as recited in claim 4 wherein said retroreflector is additionally operative to laterally displace the returned collimated light so that the refocused light forming said second image is directed neither parallel nor antiparallel to said non-absorbed light.

6. An optical imaging system as recited in claim 5 and further including a second retroreflector disposed to collect non-absorbed light transmitted from said light absorbing means during the formation of said second image and to return such non-absorbed light to said light absorbing means to define a third image in focus and in registry with said first and second image.

7. An optical imaging system as recited in claim 1 wherein said means for collecting non-absorbed light includes a retroreflector and a second imaging lens, said second imaging lens being operative to collimate said non-absorbed light and direct it into said retroreflector, said retroreflector being operative to return said collimated light to said second imaging lens, said second lens being additionally operative to refocus the collimated light onto the light absorbing means to provide said second image.

8. An optical imaging system as recited in claim 1 wherein the optical axis of said first imaging lens intersects the normal to a plane including the light absorbing means at an acute angle, said system further comprising a prism optically coupled to the light absorbing means and operative to extend the focal plane of said first imaging lens into coincidence with the plane of the light absorbing means.

9. An optical imaging system as recited in claim 8 wherein said means for collecting non-absorbed light includes a retroreflector and a second imaging lens for collimating said non-absorbed light and directing it into said retroreflector, said second imaging lens also serving to refocus the collimated light upon the light absorbing means after it is returned from said retroreflector to provide said second image, wherein the optical axis of said second imaging lens intersects at an acute angle with the normal to the plane containing the light absorbing means, and said prism is operative to extend the focal plane of said second imaging lens into coincidence with the plane of the light absorbing means.

10. An image detection system for detecting two-dimensional images, comprising:
a photosensitive detector means having a planar photosensitive surface;
first optical means having a first focal plane intersecting said photosensitive surface at a first acute angle, said first optical means being operative to project a first image of an object onto said photosensitive surface;
a prism disposed between said first optical means and said photosensitive surface and optically coupled to said detector means, said prism being operative to extend said first focal plane into coincidence with said photosensitive surface; and
second optical means having a second focal plane intersecting the plane of said photosensitive surface at a second acute angle, said prism being additionally operative to extend said second focal plane into coincidence with said photosensitive surface, said second optical means being operative to collect non-absorbed first image light reflected from said photosensitive surface and return such non-absorbed first image light to said photosensitive surface to form thereon a second image of said object in focus and in registry with said first image.

11. An image detection system as recited in claim 10 wherein said first optical means includes a collimating lens for collimating light from said object, and a first imaging lens for focusing the collimated light onto said photosensitive surface.

12. An image detection system as recited in claim 11 wherein said second optical means includes a second imaging lens and a first retroreflector, said second imaging lens being operative to recollimate said non-absorbed first image light and direct it into said first retroreflector, said first retroreflector being operative to return the recollimated first image light to said second imaging lens, said second imaging lens being additionally operative to refocus said recollimated first image light onto said photosensitive surface to form said second image.

13. An image detection system as recited in claim 12 wherein said first retroreflector is additionally operative to displace said recollimated first image light in a lateral direction so that when it is refocused onto said photosensitive surface by said second imaging lens, the path taken by the refocused first image light is neither parallel nor antiparallel to said non-absorbed first image light.

14. An image detection system as recited in claim 13 wherein said first optical means further includes a second retroreflector, said first imaging lens being operative to collect and recollimate non-absorbed second image light and direct it into said second retroreflector, said second retroreflector being operative to return the recollimated second image light to said first imaging lens, said first imaging lens being additionally operative to refocus said recollimated second image light onto said photosensitive surface to form a third image of said object in focus and in register with said first and second images.

References Cited

UNITED STATES PATENTS

| | | | |
|---|---|---|---|
| 2,779,230 | 1/1957 | White | 350—202 X |
| 3,268,719 | 8/1966 | Tackaberry | 350—202 X |
| 3,481,668 | 12/1969 | Gundlach. | |
| 3,331,688 | 7/1967 | Altman | 355—11 |
| 3,415,602 | 12/1968 | Harrick | 350—286 X |
| 1,913,795 | 6/1933 | Deisch. | |
| 3,632,182 | 1/1972 | Sincerbox | 350—3.5 |

JOHN K. CORBIN, Primary Examiner

U.S. Cl. X.R.

178—7.85; 350—203, 286; 355—11